J. A. HOLMQUIST.
WIRE FENCE MACHINE.
APPLICATION FILED MAR. 4, 1912.
1,082,697.
Patented Dec. 30, 1913.
10 SHEETS—SHEET 2.
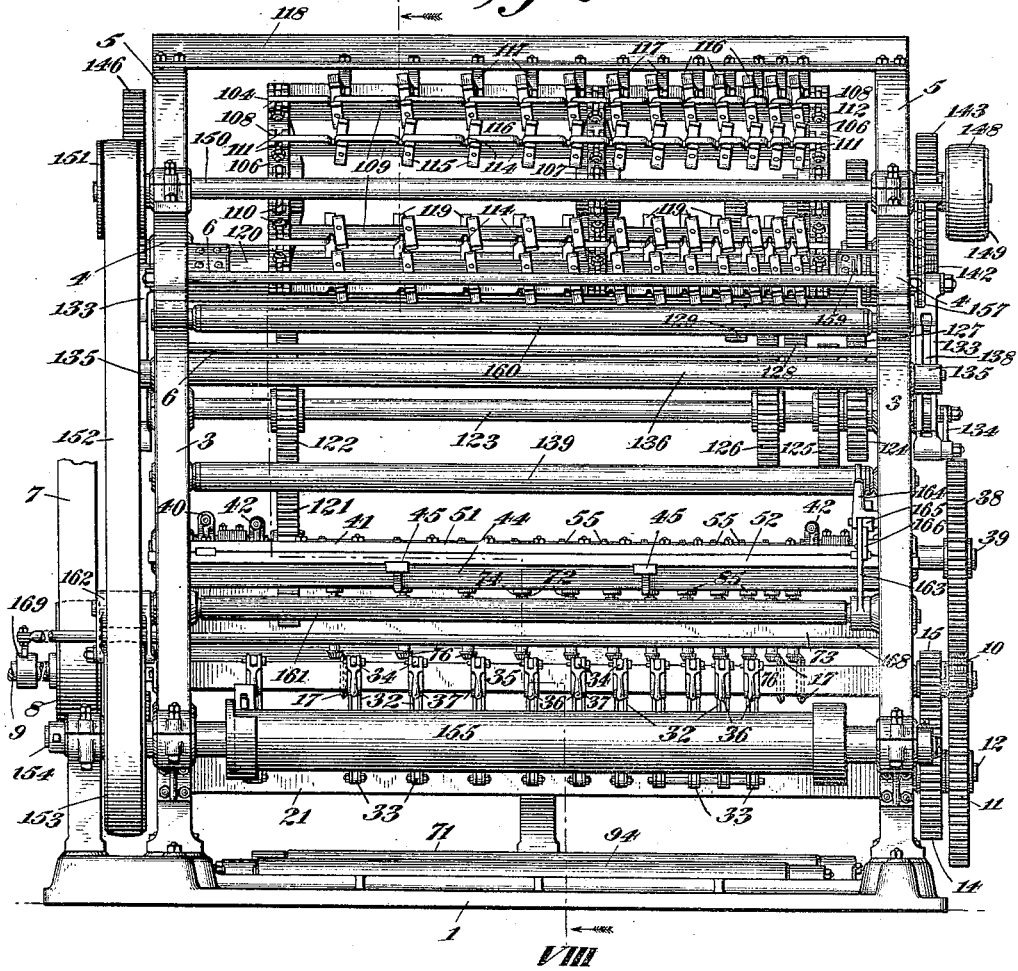
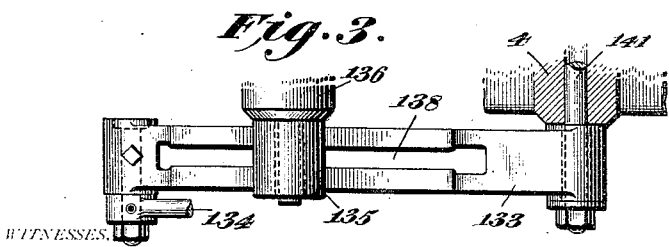
WITNESSES
Elmer Seavey
J. E. Williamson
INVENTOR
John A. Holmquist
by Geo. E. Thackray
his ATTORNEY J. A. HOLMQUIST.
WIRE FENCE MACHINE.
APPLICATION FILED MAR. 4, 1912.
1,082,697.
Patented Dec. 30, 1913.
10 SHEETS—SHEET 3.
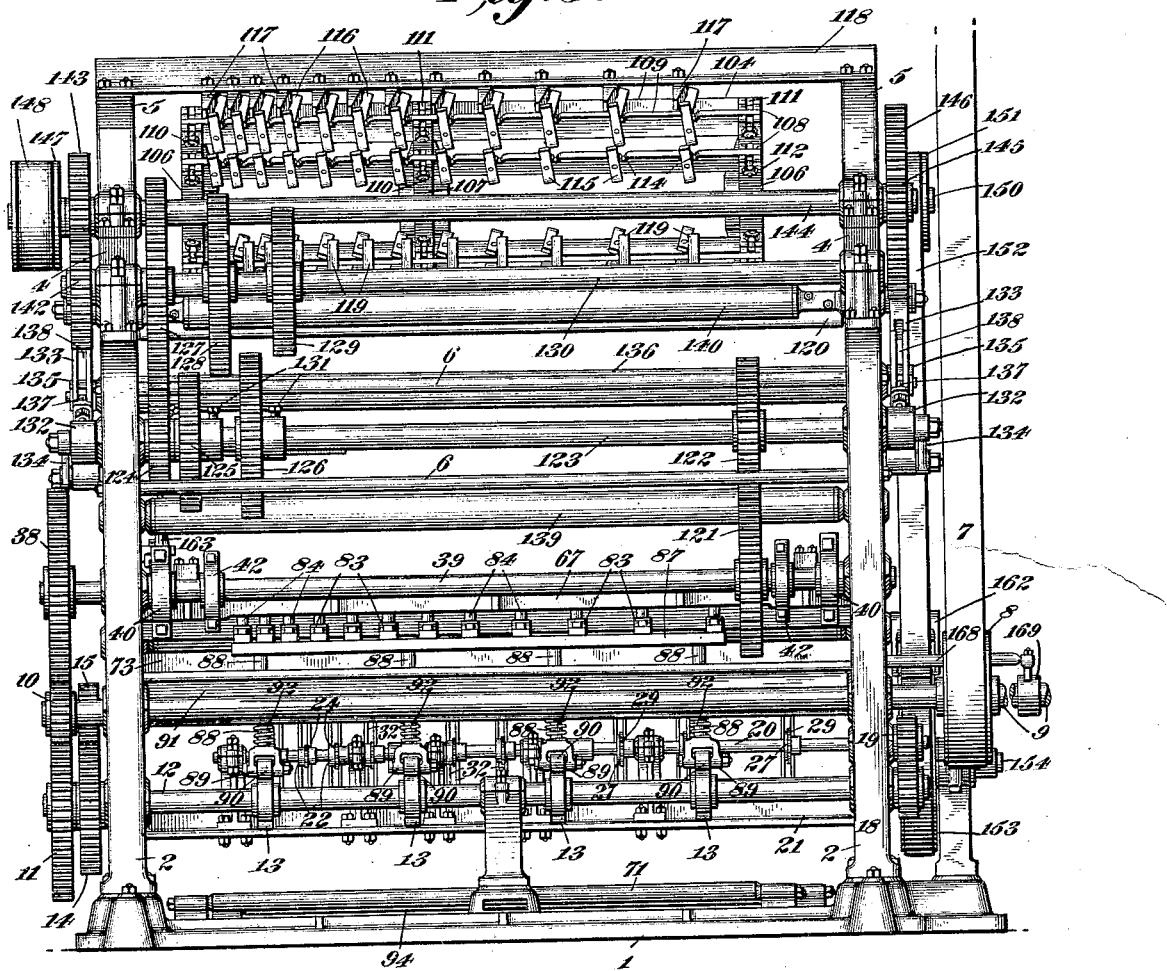
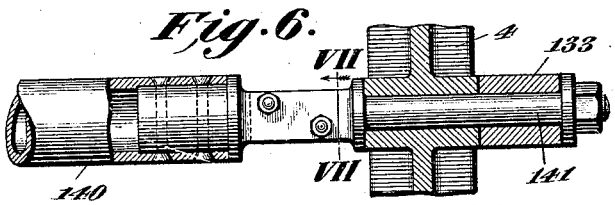
WITNESSES,
Elmer Leavey
J. E. Williamson
INVENTOR.
John A. Holmquist
by Geo. E. Thackray
his ATTORNEY.

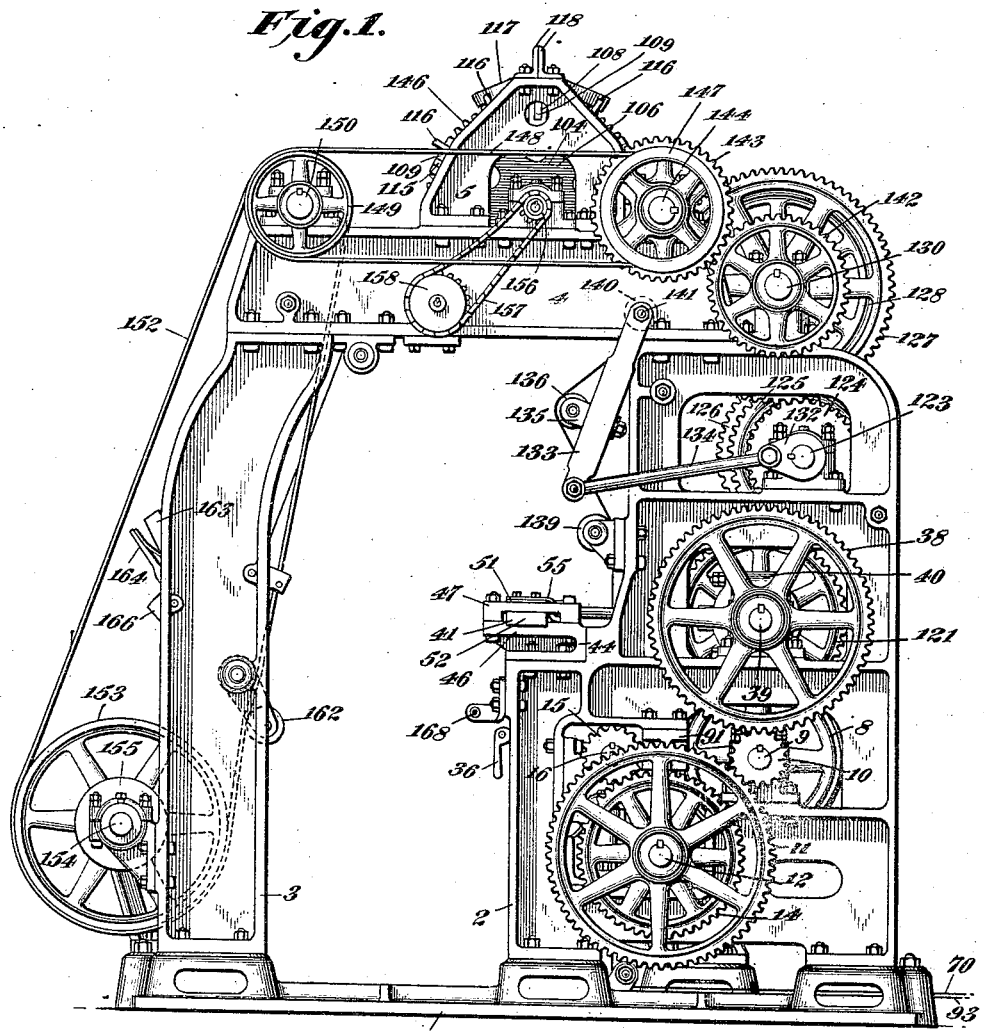

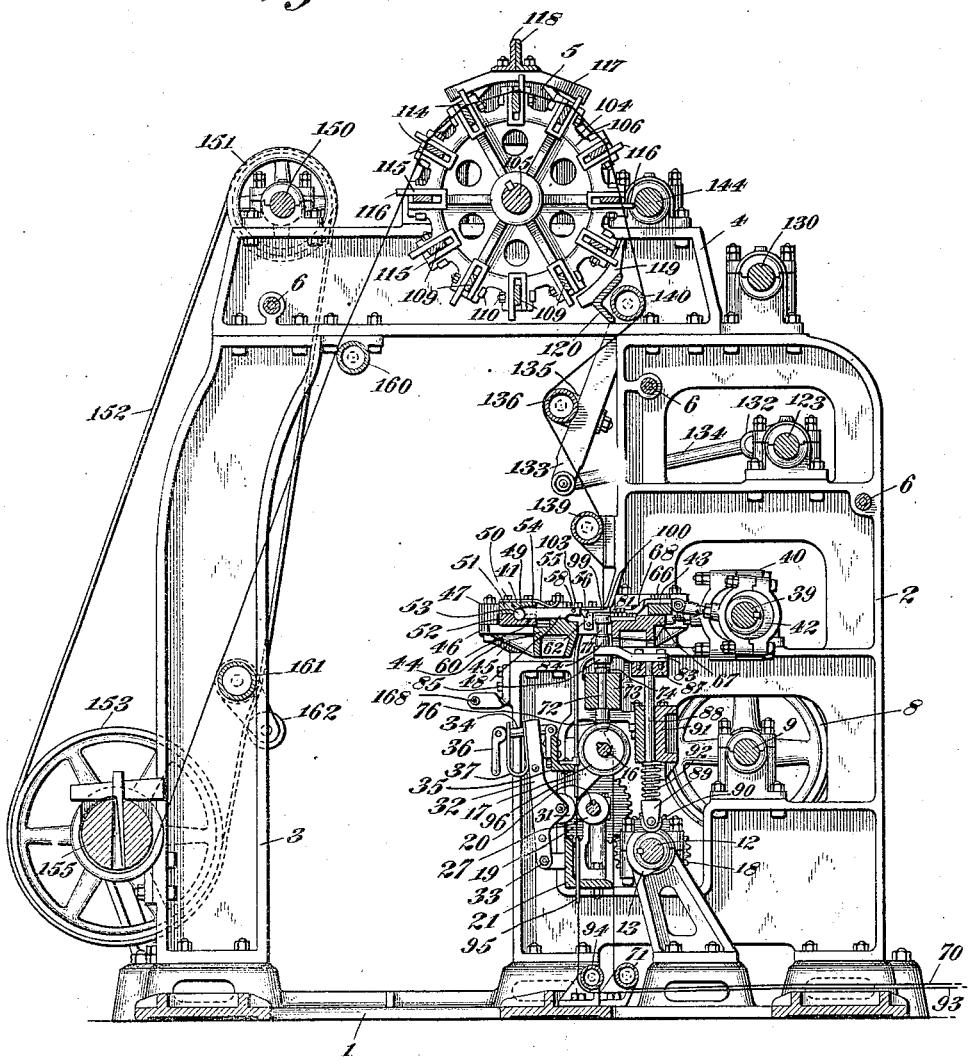

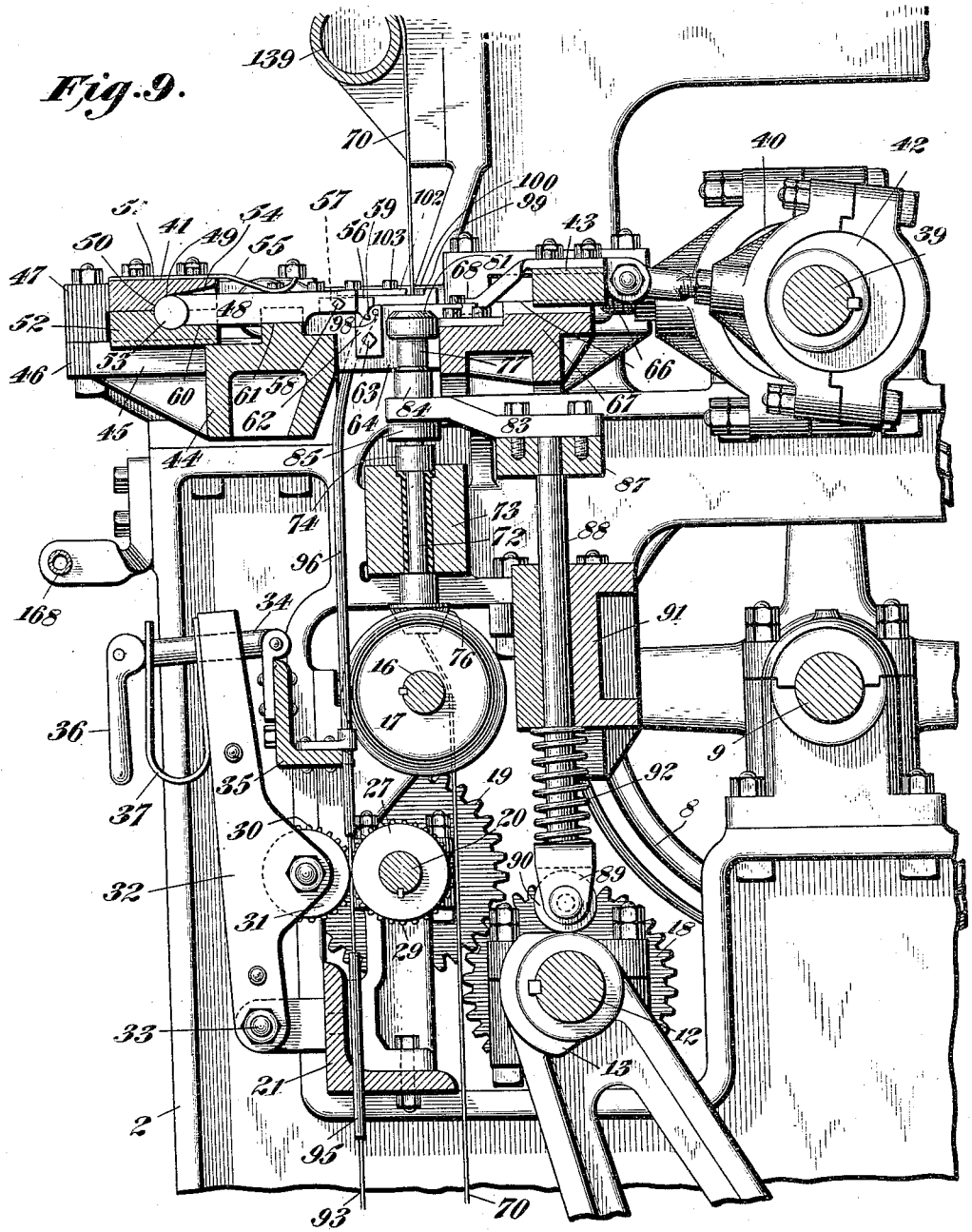

J. A. HOLMQUIST.
WIRE FENCE MACHINE.
APPLICATION FILED MAR. 4, 1912.
1,082,697.
Patented Dec. 30, 1913.
10 SHEETS—SHEET 6.
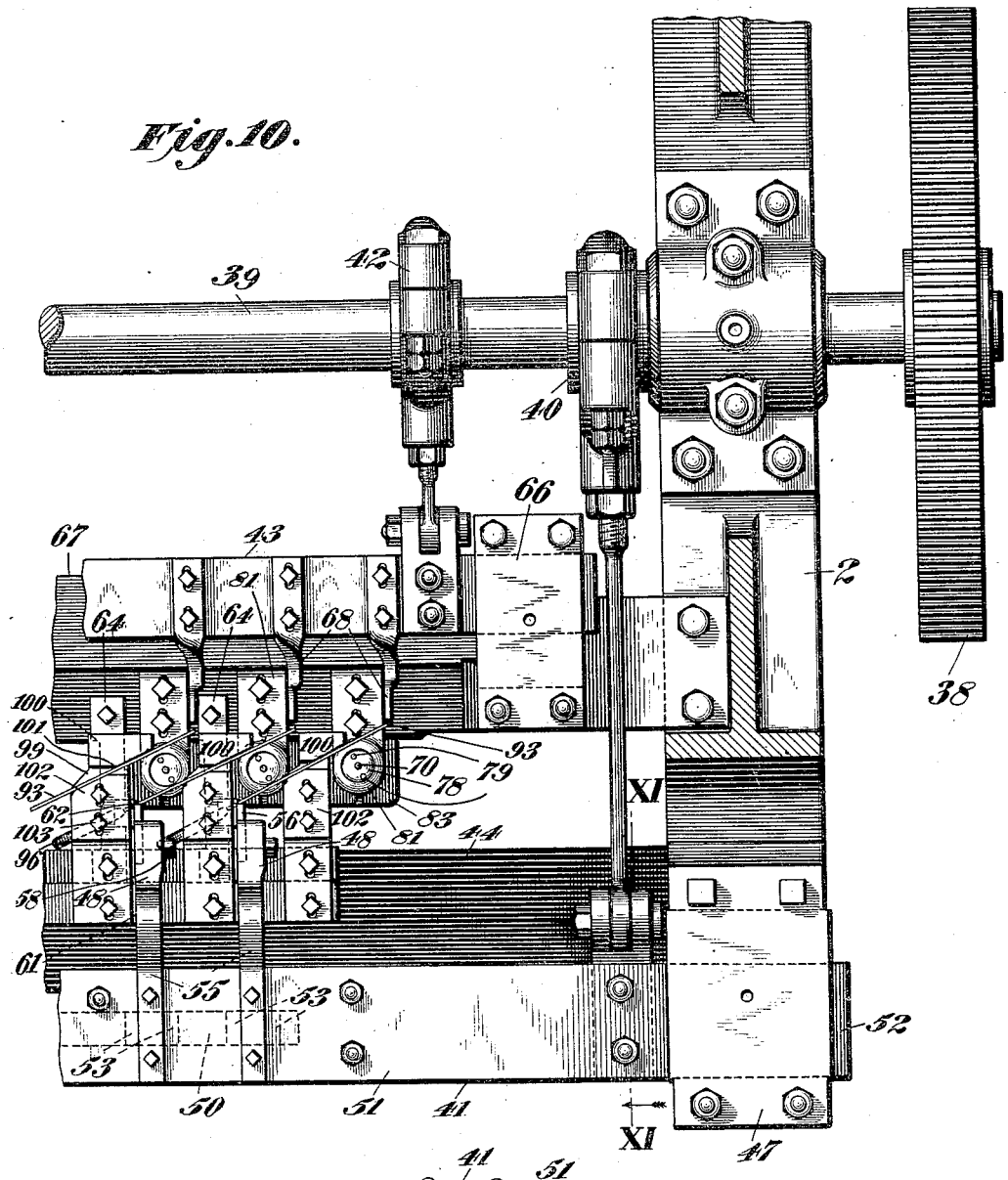
WITNESSES,
Elmer Leavey
J. E. Williamson
INVENTOR.
John A. Holmquist
by Geo. E. Thackray
his Attorney.

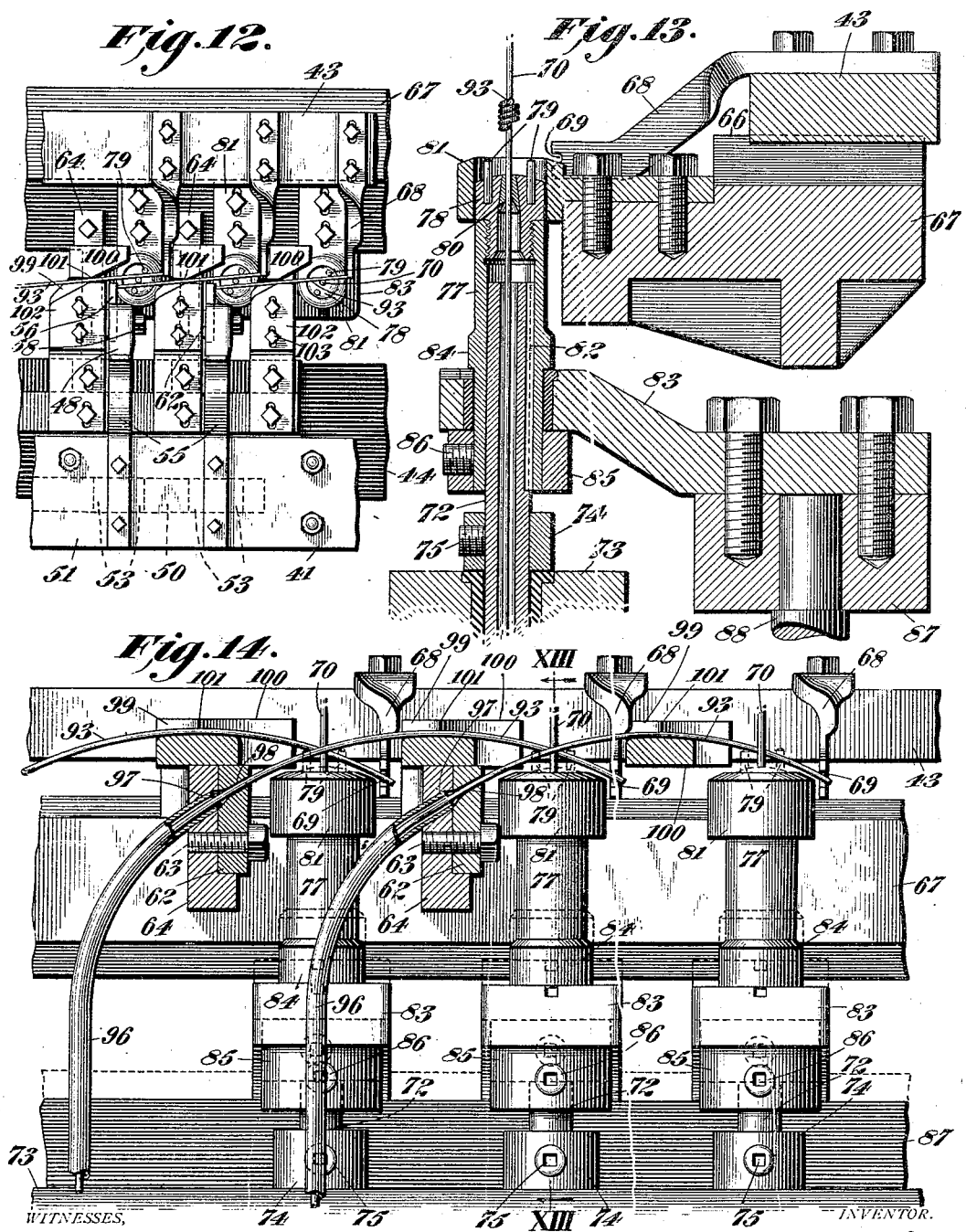

J. A. HOLMQUIST.
WIRE FENCE MACHINE.
APPLICATION FILED MAR. 4, 1912.
1,082,697.
Patented Dec. 30, 1913.
10 SHEETS—SHEET 8.
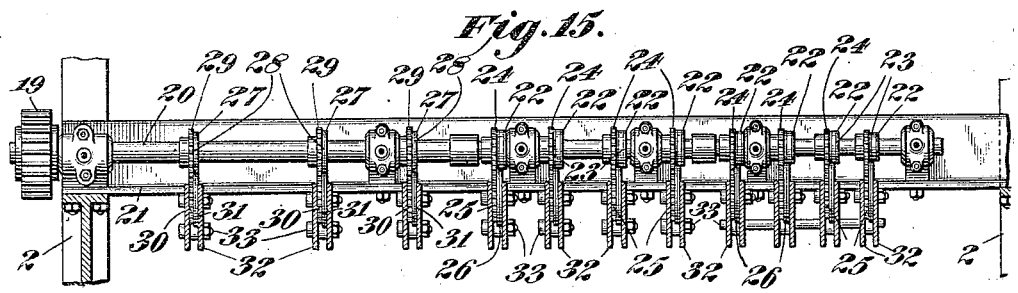
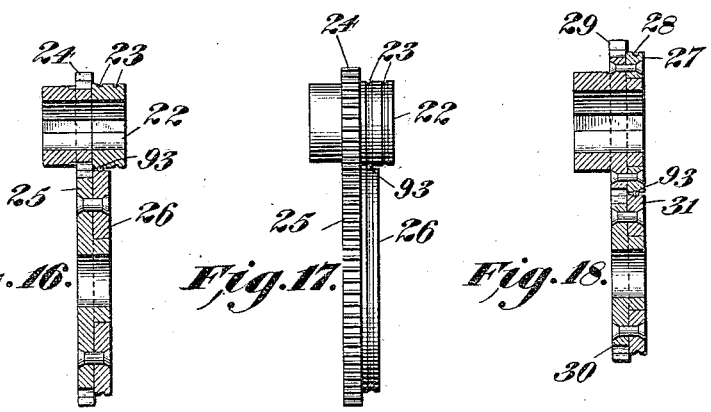
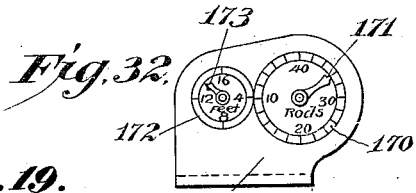
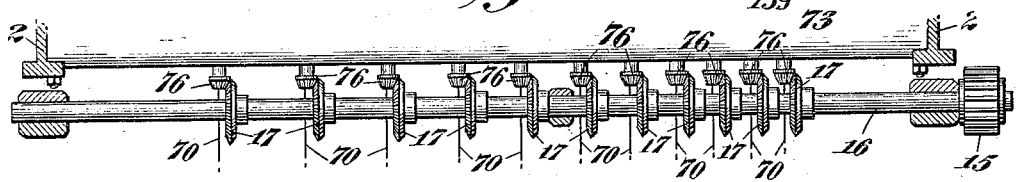
WITNESSES,
Elmer Seavey
J. E. Williamson
INVENTOR.
John A. Holmquist
by Geo. E. Thackray
his ATTORNEY.

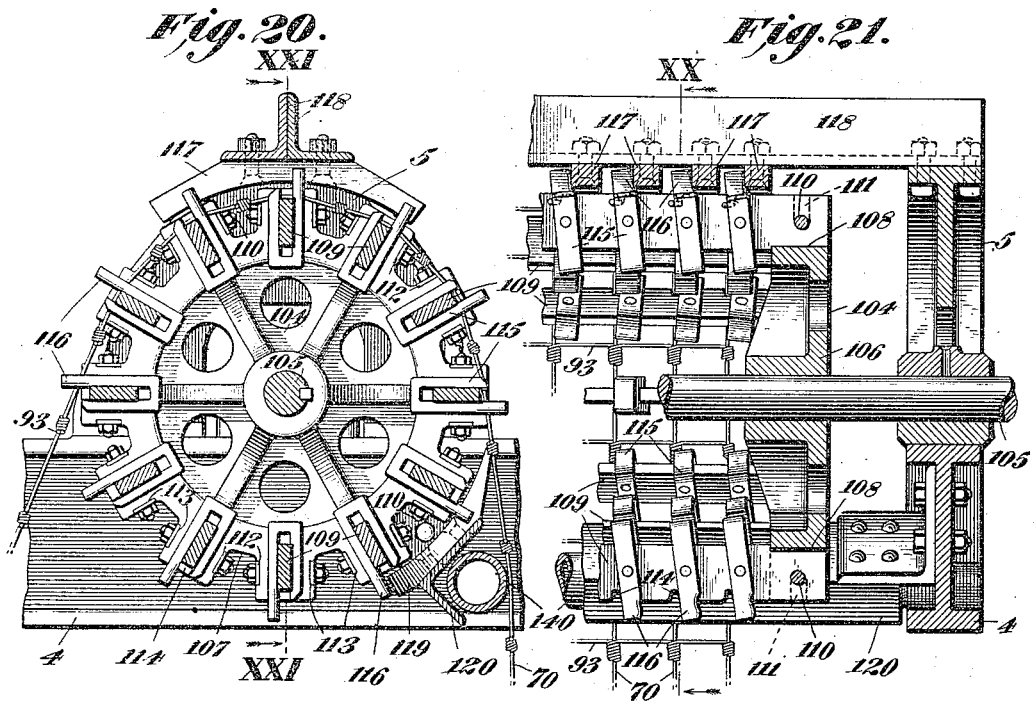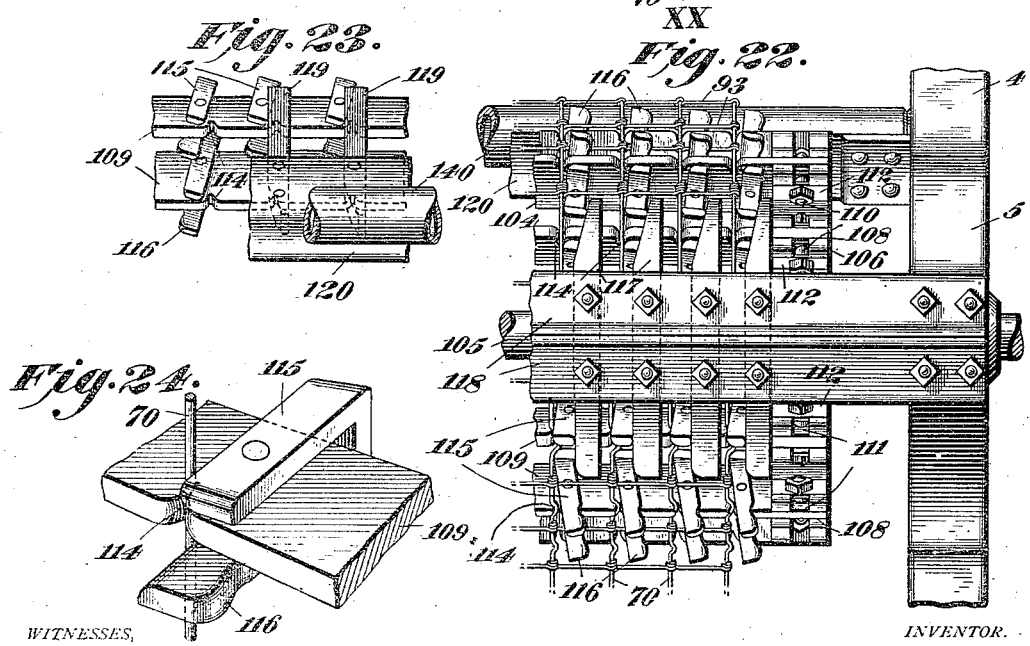

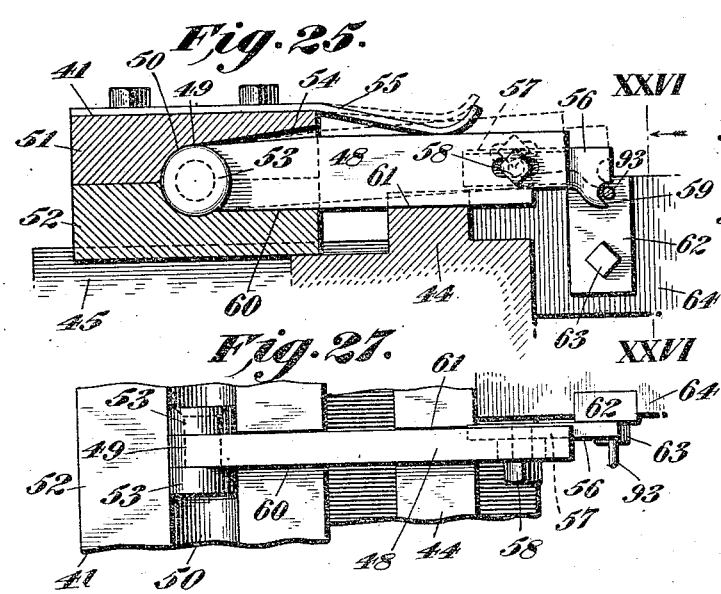

UNITED STATES PATENT OFFICE.

JOHN A. HOLMQUIST, OF JOHNSTOWN, PENNSYLVANIA, ASSIGNOR TO CAMBRIA STEEL COMPANY, A CORPORATION OF PENNSYLVANIA.

WIRE-FENCE MACHINE.

1,082,697.　　　　Specification of Letters Patent.　　Patented Dec. 30, 1913.

Application filed March 4, 1912.　Serial No. 681,397.

*To all whom it may concern:*

Be it known that I, JOHN A. HOLMQUIST, a citizen of the United States, residing in the city of Johnstown, county of Cambria, and State of Pennsylvania, have invented certain new and useful Improvements in Wire-Fence Machines and the manufacture of wire fencing thereby; and I do hereby declare the following to be a full, clear, and exact description of the invention, such as will enable others skilled in the art to which it appertains to make and use the same.

My invention relates to the manufacture of wire-fencing and particularly to a wire-fence machine for making the same with continuous strand-wires and with cut or separate stay-wires extending from one strand-wire to the adjoining strand-wire in a substantially straight line, which line may be continuous between the marginal strand-wires, the product thus made being a wire fabric with rectangular meshes. There may be any desired number of parallel strand-wires spaced apart at the required distances from each other to suit the purpose intended, and these strand-wires are connected together by cut stay-wires, each of which is of slightly greater length than the distance between the centers of the adjoining strand-wires which it spans; and the ends of said cut stay-wires are coiled around the extreme or marginal strand-wires which ultimately form the top and bottom of the fence, and intercoiled around the intermediate strand-wires where two stays are connected to the same at about the same location.

Certain of the objects of my invention relate to mechanism for, and manner of feeding stay-wires, cutting off sections of the stay-wires from continuous lengths of wire therefor, delivering the stays to the coilers, feeding and taking up the strand-wires, and crimping the strand-wires on a skeleton cylinder.

Other objects of my invention relate to the construction and arrangement of stay-wire guides, swinging knives and pusher-finger-bars and coilers for stay-wires, shields for coilers, pressure feed rolls and cams and levers therefor, adjustable take-up arrangements, delayed motion devices for swinging knives, adjustable guides, indicator for measuring the wire-fence, and other mechanism shown or described herein.

Referring now to the accompanying ten sheets of drawings which form part of this specification and on which like characters represent like parts: Figure 1 is a side elevation of my machine; Fig. 2 is a front elevation thereof; Figs. 3 and 4 are detailed views showing one of the arms of my adjustable take-up mechanism and the way of mounting it, together with the adjustable swinging take-up roller and one of its bearing blocks. Fig. 5 is a rear elevation of my machine; Figs. 6 and 7 are detailed views of one end of the upper take-up roller and one of its stationary bearings; Fig. 8 is a vertical longitudinal sectional elevation taken on the line VIII—VIII of Fig. 2. Fig. 9 is a vertical longitudinal sectional elevation of a portion of my machine taken on the same line as Fig. 8 but drawn on an enlarged scale to more clearly show the mechanisms for feeding, guiding, cutting, pushing and coiling the stay-wires and the co-related parts. Fig. 10 is a top plan view of a portion of the machine showing the guide-tables, the sliding knife-holder-bar in which are mounted the swinging knives which form combined cutters and pushers for the stay-wires, the sliding pusher-finger-bar which carries other oppositely operating pusher-fingers, the coilers and the adjacent parts of the machine showing the front ends of the stay-wires in the positions which they will assume just before they are cut into short lengths. Fig. 11 is a transverse sectional elevation taken on the line XI—XI of Fig. 10, showing the connection between the knife-holder-bar and its eccentric rod, the elongated eye in the end of which rod provides a slight lost or delayed motion for reasons which will hereinafter appear. Fig. 12 is a top plan view of a portion of the guide-tables, the shearing, pushing and coiling mechanism, which shows the stay-wires cut into lengths with their ends pushed and swung against the strand-wires over the coilers, these stay-wires being in the position which they will assume just when the coilers are raised or moved into connection with the ends thereof. Fig. 13 is a vertical sectional elevation, on an enlarged scale, of one of the coilers, the lifting-bar and the lifting-arm secured thereto for raising and lowering the coilers, one of the pusher-fingers mounted on the pusher-finger-bar, the back cross-bar and adjacent parts; this view being taken on the line XIII—XIII of Fig. 14. In this figure, the coiler is shown in its lowered position just after the ends of the stay-wires have been intercoiled around an intermediate strand-wire as shown. Fig. 14 is a transverse vertical sectional elevation through the central portion of the stationary knife or shear for cutting the stay-wires, looking toward the pusher-finger-bar, the coilers being shown in elevation in their lowered positions and also indicated in dotted lines in their raised positions. In this view the section through the guide-table and the stationary knife is taken just in front of the stay-wire so as to more clearly show it, while the coilers and other parts are shown in elevation for clearness of illustration. Fig. 15 is a top plan view of the feed roll mechanism for the stay-wires, the coöperating pressure-roll holders being shown in cross section. Fig. 16 is a cross section, on an enlarged scale, of one of the smaller feed-rolls for the stay-wires and its coöperating pressure-roll geared thereto; Fig. 17 is a top plan view of the same, while Fig. 18 is a cross section of one of the larger feed-rolls for the stay-wires and its coöperating pressure-roll geared thereto. Fig. 19 is a front elevation of the beveled-gear shaft and gearing for rotating the coilers. Fig. 20 is a vertical cross sectional elevation of the crimping-cylinder taken on the line XX—XX of Fig. 21 and Fig. 21 is a central longitudinal sectional elevation of one end of the crimping-cylinder taken on the line XXI—XXI of Fig. 20; Fig. 22 is a top plan view of one end of the crimping-cylinder. Fig. 23 is a detailed fragmentary elevation showing the crimping mechanism and the cams for returning the crimping-members so that the jaws in the crimping-bars will be free to receive the strand-wires at the proper time and place. Fig. 24 is an enlarged perspective view of one of the crimping-members pivoted on the crimping-bar adjacent to one of the jaws thereof. Fig. 25 is a detailed view taken on the line XXV—XXV of Fig. 26 showing one set of the shearing mechanism for cutting the stay-wires and pushing them into position against the strand-wires and in this illustration the swinging knife-holder-bar is shown in cross section and the other parts in elevation. In this view the movable knife-holder and knife are shown by full lines in the cutting position and are indicated in dotted lines in the position which they occupy during part of the movement of retraction, the construction being such that the knife automatically swings over the stay-wire to clear it on the return movement, thereby allowing the stay-wire feed to be continuous and without interruption. Fig. 26 is a detailed view of the shearing and pushing mechanism shown in Fig. 25 and elsewhere, this figure being taken on the line XXVI—XXVI of Fig. 25. Fig. 27 is a top plan view of one side of the shearing mechanism with the upper part of the movable knife-holder-bar removed in order to show the interior construction. Fig. 28 is a transverse section through the swinging knife-holder and knife, taken on the line of the adjustable set-bolt which connects these two portions together. Fig. 29 is a side elevation of a pivoted hand-lever with the segmental toothed rack and the pawl for engaging the same, which form part of the apparatus for tightening or slackening the belt which operates the winding-barrel on which the finished fence is coiled; Fig. 30 is a front elevation of the same, showing a portion of the side-frame in section, and Fig. 31 is a section on the line XXXI—XXXI of Fig. 29. Fig. 32 is a front elevation showing the details of an indicator attached to my machine for measuring and indicating the amount of length of fencing manufactured thereby.

Referring now to the various characters of reference on the drawings: The base-plate is indicated as 1, on which are mounted two side frames of similar construction, one right and one left. These two side-frames are each composed of a main side-frame 2 and a forward standard 3, the tops of which are connected by an arch-bar or cross-frame 4. Upon the top of this arch-bar 4 at an intermediate part thereof, is bolted a top side-frame casting 5. The two side-frames, mounted on the base-plate 1, are spaced apart by means of the pipe-separators 6 through which pass the tie-rods with nuts on their outer ends as shown. Upon these side-frames numerous bearings for journals, seats and supports for other parts are provided.

Power is transmitted to the machine from a suitable source (not shown) by means of the main driving-belt 7 and the pulley 8 on one end of the main driving-shaft 9 which extends transversely of the machine and has on its opposite end, a pinion 10 meshing with the outer gear-wheel 11 on the cam-shaft 12 on which shaft the cams 13 are mounted for lifting the coilers. On the opposite end of the cam-shaft 12 is keyed a pinion 18 which meshes with a pinion 19 on the feed-roll shaft 20. This feed-roll shaft 20 is of slightly smaller diameter at one end to accommodate the smaller feed-rolls thereon and is provided with suitable bearings which are mounted on an angle-bar 21 which extends transversely of the machine, with its opposite ends resting on, and bolted to the main side-frames 2.

Referring to Fig. 15, looking from right to left, each of the first eight feed-rolls 22 is constructed as shown in Figs. 16 and 17 with two peripheral grooves 23 which enable it to be reversed when the first groove becomes defective from wear, and, on account of the greater width of the feed-roll, to accommodate two grooves, it can be supported on, and keyed to the shaft to better advantage than a narrower roll. At the side of each feed-roll 22 and also keyed to the feed-roll shaft 20 is a small gear 24 which meshes with a gear 25 riveted as shown, to a pressure-roll 26 which latter is grooved as shown and coöperates with its companion feed-rolls to advance the wire between them. The other three feed-rolls 27 are larger and each has a single peripheral groove 28, and is securely riveted to a gear 29 which is mounted on, and keyed to the feed-roll shaft 20. Each of these gears 29 meshes with a gear 30, which latter is riveted to the pressure-roll 31 as shown in Fig. 18. Each of the pressure-rolls 31 has a groove in its periphery to register with the opposite groove of the corresponding feed-roll. The pressure-rolls 26 and 31 with their respective gears 25 and 30 are held in position by the holder 32 which consists of two flat bars, between which, the pressure-rolls and gears are revolubly mounted. These bars are each provided with a pivot-bolt 33, passing through their lower ends and through a bracket as shown, attached to the side of the angle-bar 21. At the upper end of the holder is a clamping device comprising the link 34, one end of which is pivotally attached to an angle-bar 35 and its intermediate portion passes between the two members of the holder and has a cam-lever 36 attached to its outer end. Between this cam-lever 36 and holder 32 is a U-shaped spring 37 by means of which a pressure is maintained on the wire between the pressure-roll and the feed-roll, which pressure can be released by raising the cam-lever 36. The pinion 10 on the main driving-shaft, also meshes with a gear-wheel 38 on the outer end of the eccentric-shaft 39, on which latter are mounted the two eccentrics 40 for reciprocating the sliding knife-holder-bar 41, and the two eccentrics 42 for reciprocating the sliding pusher-finger-bar 43. The front cross-bar 44 which extends transversely across the front of the machine, has a number of outwardly-extending intermediate brackets 45 and two end brackets 46 with cap members 47, all of which form the ways for the reciprocating sliding knife-holder-bar 41.

The movable knife-holder 48, as shown more clearly in Figs. 25 to 28 inclusive, is pivoted at 49 in a longitudinal circular groove 50, half of which is formed in each side of the sliding knife-holder-bar 41, said bar being composed of two parts 51 and 52 bolted together. Collars 53 are placed on either side of the pivot 49 and rigidly secured to the knife-holder as shown. The part 51 of the sliding bar has a slot 54 and a leaf-spring 55 to bear upon the shank of the knife-holder 48. The movable knife 56 is fitted into a dove-tailed recess 57 in the outer end of the knife-holder 48 and is adjustably held in place by means of a set-bolt 58 which passes through a slot in the knife-holder, while the knife-edge 59 projects from the lower side thereof. The spring 55 normally holds the knife-edge 59 always in the proper alinement for cutting the stay-wire, while the slot 54 allows enough lateral play to enable it to turn on its pivot and pass over the next stay-wire on the return stroke of the knife. The lower part of the knife-holder bar 52 also has a slot 60 and the front cross-bar 44 has a notch 61 on its top edge to further guide the knife-holder, and hold the movable knife against the side of the stationary knife 62 which latter is held, by means of a set-bolt 63, in a recess on the side of a stationary knife-holder 64. The knife-holder-bar 41 is reciprocated by means of the eccentrics 40, one at each end of the bar, the ends of the rods of which have an elongated eye 65 as shown in Fig. 11, to provide a small amount of lost motion. This lost motion, or delayed motion, due to the elongated eye, is provided so that when a stay-wire section has been cut off and pushed against the strand-wires, the coilers will have time to grasp the ends of the stay-wire before it is released by the return movement of the knife. In other words, this construction is such that the knife temporarily holds the stay-wire in proper location for the coilers to grasp its ends, and when this is done, the knife begins its return movement. The ends of the rods for the eccentrics 42, which reciprocate the sliding pusher-finger-bar 43, may also have elongated eyes of the same construction for a similar purpose. The sliding pusher-finger-bar 43 is mounted in the slide-ways 66 on the back cross-bar 67. This pusher-finger-bar 43 has mounted thereon, a series of pusher-fingers 68, each of which is bent downward and outward, and each has a notch 69 on its outer face to engage and push the end of a stay-wire into position over a coiler, in coöperation with the corresponding knife, which, at about the same time, operates on the other end of the stay-wire, to cut it from the continuous supply of stay-wire stock and push the severed end over its coiler.

Referring now to Figs. 8 to 14 inclusive, the strand-wires 70 are taken from large or convenient coils over sheaves (not shown) under the roller 71, which is mounted in bearings on the base-plate 1. The strand-wires pass upwardly through the hollow coiler-spindles 72, which are revolubly mounted in the bar 73, which latter has its ends attached to the main side-frame members 2, said spindles 72 being held against vertical movement by the collars 74 and set-screws 75, on top of the bar, and by the small bevel-pinions 76 which are keyed to the lower ends of said coiler-spindles 72. These bevel-pinions 76 mesh with, and are driven by the bevel-gears 17 on the shaft 16. The strand-wires, after passing through the coilers, extend into the sleeves 77 surrounding the top of the hollow coiler-spindles, and pass out through the coiler-heads 78, each of which carries the coiling pins 79, which attach the stay-wires to the strand-wires. Each coiler-head 78 is screwed into the top of the sleeve 77 and has a tapered internal bushing 80 of hardened steel, which may be easily withdrawn and a new one substituted in case of wear. The hollow coiler-spindle 72, the sleeve 77 and the coiler-head 78 are driven continuously by means of the bevel-gears 17 and the bevel-pinions 76 in mesh therewith, and the coiling pins are protected normally from coming in contact with the stay-wires, by an annular shield 81, which is bolted to the back cross-bar 67 by a rearwardly extending flange as shown. The coiler-spindles 72 and the sleeve 77 are keyed together by means of a spline 82 which allows the sleeve 77 and coiler-head 78 to be raised and lowered vertically. The lifting-arm 83 is provided with a series of openings, in each of which is a bushing surrounding an intermediate portion of the barrel of the sleeve 77, between its annular shoulder 84 and the collar 85 provided with a set-screw 86, as clearly shown in Fig. 13. The other end of the lifting-arm 83 is bolted to the lifting-bar 87, which latter is raised and lowered by the lifting-rods 88 provided at their lower ends with forks 89 containing the anti-friction rollers 90 which rest on the cams 13 and is operated thereby to raise and lower the coilers. Each lifting-rod 88 slides vertically in a bearing on the side of a transverse bearing-bar 91 and a spring 92 surrounds the lower end of each rod 88 between the fork 89 and the transverse bearing-bar 91.

The stay-wires 93 are taken from large coils over sheaves (not shown) in the rear of the machine and pass under the rolls 94 mounted on the base plate 1, thence through the lower guiding-tubes 95 between the feed-rolls 22 or 27 and their respective pressure-rolls 26 and 31, all of which are driven continuously. Each stay-wire is then fed upwardly through an upper guiding-tube 96, curved at its upper end and extending into the opening 97 of the stationary knife-holder 64, thence through the hole 98 in the stationary knife 62 and into the notch 99 on the guide-table 100, said notch 99 having a narrow neck portion 101. One portion of the guide-table 100 is made adjustable as at 102 by means of set-bolts 103 which allow the width of the notch 99 to be regulated as desired, to accommodate wires of different sizes or curvature. Each stay-wire is fed in diagonally or at an angle as shown in Fig. 10 and is advanced far enough to be engaged by the notch 69 of the pusher-finger, at which time the pusher-fingers 68, mounted on the bar 43, are advanced forward, by means of the eccentrics 42, until they are substantially in the plane of the backs of the strand-wires; at the same time the sliding knife-holder-bar 41 which carries the knife-holders 48 with the knife-blades 56, is moved rearwardly by means of the eccentric 40, thereby severing the ends of the stay-wires and carrying the end of each cut stay-wire rearwardly until it comes in contact with the front of the strand-wire as shown in Fig. 12.

The middle of each cut stay-wire, where it passes through the neck 101 of the notch 99, is not moved from its position, as the construction and operation are such that the neck 101 acts as a fulcrum for the cut stay-wire, and only the two ends of the same are swung over the coilers, and this is one of the particular features of my invention. The coilers are then raised by means of the cams 13 which actuate the spring-pressed lifting-rods 88 through the anti-friction rollers 90 at their lower ends, thereby operating the lifting-bar 87 and the attached lifting arms 83 which surround the coiler-sleeves 77. As said mechanism raises and lowers the revolving coilers, the coiling and intercoiling of the ends of the cut stay-wires around the strand-wires is done during the time when the anti-friction rollers 90 are raised and supported temporarily for a brief period of time at the same elevations by the action of the most exterior concentric portions of the cams 13. During this time the strand-wires are advancing slowly, as hereinafter described, their speed being about such as to permit the coiler fingers to maintain engagement with the ends of the strand-wires. In other words,—at this time, the strand-wires are advancing about as fast as the axial movement on them, in the reverse direction, of the helical coils of cut stays, thereby maintaining the coilers in connection with the ends of the cut stays and producing neat and close coils thereof. After the coiling is completed and the coiler heads drop back within their shields by spring and cam action, as above described, the fence is moved forward to crimp the strand-wires, in order to allow for expansion and contraction thereof, in use and to take up any slack or irregularity in them during this manufacture. To accomplish this, the fencing, after leaving the coilers, passes upwardly and over a crimping-cylinder 104, which is mounted on the shaft 105. This crimping-cylinder has two head castings 106 and an intermediate supporting casting 107, all of similar construction, and provided with slots 108 for the reception of the crimping-bars 109, which are held therein by the bolts 110, which pass through said crimping bars 109 and through notches 111 at the sides of the slots 108. These bolts 110 are prevented from falling out, when the nuts thereof are screwed home, by the locking plates 112 located in recesses 113 at the sides of the slots as shown in Figs. 20 and 22.

Each crimping-bar 109 has a number of jaws 114 formed therein at varying distances apart along its outer edge, adjoining each of which is a substantially U-shaped crimping-member 115 pivoted to the crimping-bar 109; one crimping-member for each jaw, as shown particularly in Figs. 20 to 24 inclusive.

One leg 116 of each crimping-member 115 is longer than the other leg thereof and extends beyond the edge of the bar 109 to engage the crimping-cam 117 above the crimping-cylinder for crimping the strand-wires. There is a series of these cams 117 corresponding to the various sets of crimping-members as shown, and each cam is bolted to a pair of angle-bars 118, which extend transversely of the machine and are secured by their ends to the upper surface of the top side-frame casting 5.

Return cams 119 are mounted on an angle-bar 120 located near the lower part of the crimping-cylinder to insure the return of the crimping-members 115 to positions such that the strand-wires 70 may enter the jaws 114. The accompanying and return movements of the crimping-members 115 are automatically accomplished by the revolution of the crimping-cylinder, whereby the ends of said crimping-members contact with the crimping-cams and the return cams at the proper times, whereby said crimping-members are swung on their pivots, first in one direction, and then in the opposite direction.

The movement of the strand-wires 70 is continuous through the machine, but variable, and is slower at the time of coiling the cut stay-wires thereon, in order to give the coiling pins 79 time to neatly coil the ends of the stay-wires around the strand-wires; this is accomplished by means of the adjustable take-up device.

On an intermediate part of the eccentric shaft 39, is keyed a gear 121, which meshes with the gear 122 mounted on the pull-out shaft 123. This pull-out shaft has also keyed thereon, by means of a spline, the adjustable gears 124, 125 and 126 which are adapted to mesh with the gears 127, 128 and 129 respectively, on the intermediate shaft 130. The gears 124 and 127, as shown in mesh in the drawings, are used when the stay-wires are to be six inches apart; while the other two sets are used when the stay-wires are to be nine or twelve inches apart respectively. The gears 124, 125 and 126 can be adjusted and retained in places desired, by the set-bolts 131 so as to be thrown out of, or into engagement with their respective mates. On the ends of the pull-out shaft 123, are keyed short cranks 132, which latter are connected to the swinging take-up arms 133 by the pitmen 134.

Referring now more particularly to Figs. 1, 3, 4, 6, 7 and 8, the swinging take-up arms have each adjustably mounted thereon, a bearing-block 135 which serves as a bearing for the adjustable swinging roll 136. These bearing-blocks 135 are each provided with a projection 137 with a threaded end, which extends through a slot 138 in the take-up arm 133, and a nut and washer securely clamp it in position, as shown in Figs. 1 and 4. The adjustable swinging roll may be thus secured in any location desired, on the swinging take-up arms 133, and the amplitude of its movement thereby varied to suit the other requirements. An idler roll 139 is mounted in fixed bearings on the main side-frame 2 just below the swinging take-up arm 133 and an upper idler roll 140, having outwardly extending spindles 141, is mounted in permanent bearings formed in the side-frame member 4. The outer ends of these spindles 141 form the bearings from which the take-up arms 133 swing, as shown in Figs. 1 and 6.

It will be obvious, by referring to Figs. 1 and 8, that, as the adjustable roller 136, mounted on the swinging take-up arm, is swung inward and outward between the idler rollers 139 and 140 by the pitmen 134 and the cranks 132, the movement of the fencing will be retarded and accelerated at each revolution of the crank arm 132. The revolution of the crimping-cylinder is substantially uniform and continuous, and on this cylinder the strand-wires are clamped and pulled forward accordingly. The interposition of the adjustable take-up mechanism between the crimping-cylinder and the coilers, causes a variable speed of the strand-wires through the coilers, whereby the strand-wires move more slowly than the average when the stay-wires are coiled thereon, and more quickly than the average during the intervals between the successive coiling operations. After a set of cut stay-wires are coiled on the strand-wires, the strand-wires are quickly pulled out into an obtuse loop, by the forward movement of the adjustable take-up roll 136, as shown in Fig. 8, thereby traversing them at an accelerated rate of speed through the coilers. As the adjustable take-up roll moves backward, the strand-wires therefore move more slowly through the coilers, during which time the stay-wires are coiled thereon. During this latter time the crimping-cylinder receives the slack or excess of strand-wires, delivered to it by reason of this action. By clamping the swinging roll 136 nearer to, or farther from the lower ends of the take-up arms 133 the amplitude of its movement may be varied and the take-up action and the variable speed of the strand-wires may be accurately adjusted in harmony with the coiling and other operations. I can also adjust this take-up mechanism so that the strand-wires are stationary during the coiling operation.

On one end of the intermediate shaft 130 is a gear 142 which meshes with a gear 143 on the crimping-cylinder driving-shaft 144, on the opposite end of which latter is mounted a pinion 145 which meshes with the gear 146 keyed on the crimping-cylinder shaft 105 for rotating the same. The crimping-cylinder driving-shaft 144 also carries a flanged pulley 147 connected by the belt 148 to the pulley 149 on one end of the shaft 150. On the opposite end of the shaft 150 another flanged belt pulley 151 is keyed, and connected by the belt 152 to the pulley 153 on the stub-shaft 154 of the winding-barrel 155, on which is reeled the completed fencing after it leaves the crimping-cylinder.

A small sprocket-wheel 156 is attached to one end of the crimping-cylinder shaft 105 and connects thence by means of a sprocket-chain 157 to a larger sprocket-wheel 158 which turns an indicator 159 located inside of the side-frame for measuring the length of the fencing as it passes over the crimping cylinder.

Fig. 32 is a front elevation of the indicator on a larger scale than that of the other figures. This indicator consists of a series of toothed counting wheels meshing with each other and provided with bearings all so arranged that it will register accurately the number of rods and feet of fencing fed forward by the crimping cylinder. This measuring action is positive by reason of the fact that the mechanism on the crimping cylinder firmly takes hold of and crimps the strand-wires so that the amount of fence which is advanced is correctly recorded by the indicator, which is positively driven by the crimping-cylinder. The indicator has preferably two dials, as shown in Fig. 32, the righthand one showing the number of rods, and the lefthand one showing the number of feet; the righthand dial being indicated as 170 and provided with a pointer 171, while the lefthand dial is marked 172 and is provided with a pointer 173, the dials being marked and graduated in rods and feet, as shown. As the crimping-cylinder positively engages the strand-wires, this indicator thus accurately measures the length of fence, so that the exact quantity in each roll is known. The indicator referred to, is a register, recorder, or similar device, which is so proportioned and arranged as to show in figures or characters, the lengths of finished fence delivered by the crimping-cylinder.

A belt tightener 162 for the belt 152 is mounted on the end of the spindle of the roll-shaft 161 and is operated by the mechanism shown in Figs. 29 to 31 inclusive, comprising a lever 163, the handle of which carries a spring-pressed gripping member 164, to which a pawl 165 is pivoted, contacting normally with the teeth of a segmental rack bar 166. The lever 163 also carries the guide 167 for retaining it in its proper position against the side of the segmental rack bar. A clutch-rod 168, at the front of the working tables, connects with a clutch 169 on the main drive-shaft 9 for starting or stopping the machine when desired.

In order to enable the machine to make fencing with the stay-wires located at various predetermined distances apart, the crimping-cylinder 104 is so arranged that it will revolve at a faster rate when it is desired to make fencing with stay-wires far apart, and at a slower rate when the stay-wires are to be nearer together, as the speed of the mechanism for cutting and coiling the ends of the stay-wires around the strand-wires always remains substantially the same with respect to that of the main driving-shaft. To this end, I have shown three sets of gearing for revolving the crimping-cylinder 104 at three different speeds, as desired, thereby pulling the strand-wires 70 faster or slower through the coilers, although more sets of gearing may be used, if required.

As shown in Fig. 5, the gears 124 and 127, mounted on the shafts 123 and 130 respectively, are used when the stay-wires are to be six inches apart; the gears 125 and 128 are used when the stay-wires are to be nine inches apart, and the gears 126 and 129 are used to produce twelve-inch spacing of stays. As shown in Fig. 5, the gears 124 and 127 are in mesh, whereby the machine is set to make the stays six inches apart, while at the same time the other pairs of speed gears are idle.

Having thus given the foregoing general and detailed description of my machine and the operation thereof, I will now further describe the operations of manufacture and the points of excellence of my invention. The strand-wires 70 are supplied to the machine from large coils or reels thereof (not shown) located to the rear of the machine, are thence conducted under the roll 71, thence upwardly through the hollow coiler-spindles 72, thence through the central perforations in the hollow coiler-heads 78, between the two coiler-pins 79 thereof, which are revolving continuously during the operation of the machine. At this point the cut stay-wires are applied to the strand-wires and the fabric moves upward behind the idler-roll 139, thence in front of the adjustable swinging take-up roll 136, thence behind the idler-roll 140, thence to the revolving crimping-cylinder 104, where the strand-wires pass into the jaws 114 of the crimping-bars 109 and are clamped and crimped therein by the swinging action of the U-shaped crimping-members 115, due to the action of the crimping-cams 117 thereon. During the revolution of the crimping-cylinder, the strand-wires are clamped and crimped on the then upper portions of the crimping-cylinder, while at the same time, the stay-wires lie between the crimping-bars thereof, as particularly shown in Figs. 8, 20, 21, 22 and 24. As the crimping-cylinder continues its revolution, the crimping-members 115 move out of engagement with the crimping-cams 117 and then swing open by contact with the strand-wires as they leave the cylinder. The return cams 119 then further insure the return of all the crimping-members to open position. The now completed fencing travels diagonally downward past the supporting rolls 160 and 161 and is wound in a roll on the winding-barrel 155. When enough of the finished fence has accumulated on the winding-barrel 155, as measured by the indicator 159, the machine is stopped, the strand-wires cut, the completed roll of fencing taken out and a new roll started by securing the severed ends of the strand-wires on the winding-barrel, whereupon the machine is started to make another roll. As the strand-wires are firmly clamped on the crimping-cylinder 104 which moves with a uniform speed of revolution, this determines the average speed of the movement of the strand-wires and the fence through the machine, while the winding-barrel 155 is revolved by the belt 152 which can be made tighter or looser, as desired, so as to keep the fence reasonably taut, as it is wound thereon. As the roll of finished fencing increases in size, the belt 152 may be slightly slackened by the belt-tightener 162 and appurtenances, so that said belt will slide somewhat on its pulleys, while at the same time maintaining the required degree of tautness in the roll of fencing.

Although the average speed of travel of the strand-wires and the attached stay-wires is maintained at a uniform speed on the crimping-cylinder, the adjustable take-up roll 136 provides a means for varying the speed of the strand-wires through the coilers in the following manner:—As shown in Fig. 8 the take-up roll 136, mounted on its swinging-arms 133, is in its extreme outward position, and has thereby completed the formation of an obtuse angular loop in the strand-wires, which is accomplished while this roll is moving outwardly. This action, together with the continuous movement of the crimping-cylinder 104, causes an accelerated motion of the strand-wires through the coilers, which is so timed as to occur just after the stay-wires have been coiled thereon. During the return movement of the adjustable swinging take-up roll 136, the amount of fence residing in the aforesaid obtusely angular loop, is delivered to the crimping-cylinder so that the pulling speed of the crimping-cylinder on the lower portions of the strand-wires is lessened at this time, and the strand-wires therefore move at a much slower speed through the coilers. While the strand-wires are moving at this slower speed through the coilers, the stay-wires are attached thereto, as elsewhere described herein, the object and intention of this variable speed being to simplify the mechanism and to facilitate the operation of the coilers. By further adjustment of the take-up roll, the movement of the strand-wires can be substantially stopped, if desired, during the coiling of the stay-wires thereon.

My adjustable take-up roll 136 is capable of being adjusted at various points on the take-up arms 133 so that the amplitude of its movement and the times of acceleration and retardation of the longitudinal motion of the strand-wires through the coilers, can be closely regulated in conformity with the movement of the stay-wires, and the action of the coilers in securing the stay-wires to the strand-wires. This is a delicate and essential feature of my invention, whereby the movements of the strand-wires and of the stay-wires in process of application thereto, may be carefully timed and adjusted to produce neat, close coils, without requiring the coilers to rapidly follow the strand-wires; while the coilers are continuously revolving at all times during the operation of the machine.

Referring now to the stay-wires, the material for these is supplied from a number of large coils or reels of wire (not shown) located in the rear of the machine, from which the wires indicated as 93 are led under the roll 94 and pass thence upwardly between the stay-wire feed-rolls 22 and 27 and their respective pressure-rolls 26 and 31, all of which are provided with semi-circular or segmental grooves as shown. The feed-rolls are all mounted on a feed-roll shaft 20 which is driven continuously at a uniform rate of speed and each of the stay-wires is consequently fed continuously without stoppage or retardation. The different feed-rolls, however, are made of various diameters in order to supply the exact lengths of stay-wires to span the different spaces between the strand-wires, the reason for this being that fences of the character in question are ordinarily made with strand-wires closer together at the bottom than at the top, the spacing gradually increasing from the bottom to the top, to better serve the purpose intended. As the stay-wires pass the continuously operating feed-rolls, they are pushed thereby, into the upper curved guide-tube 96, thence through the hole 98 in the stationary knife 62 assuming the form and position indicated in Figs. 10 and 14. As soon as this is done, the movable knives 56 move forward and sever the stay-wires from the long lengths of stock therefor, thereby cutting off pieces of the right lengths to span the distances between the adjoining strand-wires, and enough more to form the coils of the stay-wires thereon. The action of these movable knives 56 is accomplished by means of the mechanism hereinbefore described, and at about the same time, the pusher-fingers 68 engage the other ends of the now cut stay-wires and by the combined action of the movable knives and the pusher-fingers, the cut stays are swung from their diagonal or angular positions to positions approximately in the plane of, and touching the strand-wires, as indicated in Fig. 12. Each stay-wire, however, contacts with one strand-wire at one side of the fence and an adjoining strand-wire on the opposite side of the fence. In order to assist this operation, the guide-tables 100 are provided with narrow necks 101 in the notches 99 thereof, which serve as fulcra about which the cut stay-wires are swung. At about this time the cam 13 on the shaft 12 operates to raise the coilers, whereby the pins 79 thereof engage the downwardly projecting ends of the stay-wires which overlap each intermediate strand-wire, or in case of the marginal connections, one of each of the pairs of said pins engages the downwardly projecting ends of the extreme stay-wires where they overlap the marginal top and bottom strands of the fence. The coilers which, during the operation of the machine, are always and continuously revolving in the same direction at substantially uniform speed, now intercoil and coil the ends of the stay-wires around the strand-wires during the time when the coilers are held in their upward position by the action of the outer concentric surface of the lifting-cam 13, the upward movement of the coilers being preferably only a fraction of an inch. At this time, due to the action of the adjustable take-up mechanism, as described elsewhere herein, the strand-wires are moving slowly, or with delayed motion through the coilers, and this motion is capable of exact and careful control to the end desired, so that the forward speed of translation of the strand-wires, during the time of coiling the stay-wires thereon, is so adjusted that it substantially corresponds to the axial backward speed of the formation of the helices or coils of the stay-wires which are being formed upon the strand-wires; all in such a way that the slight forward movement of the strand-wires, compensates for the slight backward movement or growth of the coils, whereby smooth and close coils are formed, as will be readily understood.

In order to permit the continuous feeding or pushing of the stay-wires without interruption, the movable knife 56 is mounted on a swinging knife-holder 48 which is normally held in cutting position by means of the spring 55, and the cutting portion 59 of the knife 56 is somewhat hook-shaped as shown, the lower part of which projects below the main body thereof. After this hook-shaped projection 59 of the knife 56 has, by its forward movement, cut the stay-wire 93 into a cut-stay section, the knife is retracted, and by reason of the slope of the rear of the hook-shaped portion, it is automatically lifted upward by the next portion of incoming stay-wire, as it passes and slides backwardly over the same, the position at this time being as shown in dotted lines in Fig. 25. By reason of this construction, and the continuous movement of the stay-wire feed-rolls 22 and 27, the stay-wire feed is continuous at all times during the operation of the machine. After the coilers have been slightly projected upward for the purpose of forming the coils as heretofore stated, they drop downward within their shields 81 by the further action of the cam 13, and so remain when the roller 90 rests upon that portion of the cam surface nearest the center of the shaft 12. When the coilers are in this position within their shields, the stay-wires are fed into diagonal positions over the coilers as heretofore described, without the possibility of stoppage or of deflection by the coiler-heads or coiler-pins. After the cut stays are attached to the strand-wires the partially completed fence is pulled forward with an accelerated movement by the combined action of the adjustable take-up roll 136 and the revolution of the crimping-cylinder 104, as hereinbefore described.

In addition to the statements and descriptions of my invention made elsewhere herein, a summary of the following points may serve to make the matter more clear: The strand-wires are pulled forward by the continuously revolving crimping-cylinder which turns with a substantially uniform motion; but, by means of the adjustable take-up mechanism, the speed of the strand-wires, through the coilers, is accelerated after each set of cut stays has been coiled thereon, and said speed is also retarded or delayed at the proper times to accommodate the application of the cut stays. This, therefore, maintains the speed of manufacture and conduces to ease of operation. There is also an advantage in the comparatively slight longitudinal movement of the coilers to keep them in contact with the stay-wires and this forward movement is comparatively slight, easily accomplished and controlled by means of the mechanism herein described for this purpose. Further advantages reside in the fact that the coilers rotate continuously at substantially uniform speed in one direction, which aids in making the machine run easily, without jar, wear or breakages.

Simplicity and ease of the stay-wire feed without waste or interruption, is accomplished by means of the continuously operating stay-wire feed-rolls and their companion pressure-rolls, in connection with the swinging-knife which is adapted to be retracted and automatically swung over the next portion of incoming stay-wire, without interfering with the continuity of its feed.

Another particular feature of the machine consists in the diagonal manner of feeding the stay-wires over the coilers, then cutting off the stay-wires into proper lengths, and then pushing the ends of the cut stays into positions against the strand-wires by the continued action of the cutting knives which push the severed ends, and the opposite action of the pusher-fingers on the other ends which thus swings them into position for the coiling operation.

A further advantage lies in the manner of, and mechanism for crimping the strand-wires on the crimping-cylinder, whereby waves are made in the strands to allow for contraction and expansion in use and for the further purpose of providing a uniform tension in, and feed of the strand-wires during the manufacture of the fencing, thereby also equalizing the lengths of the strand-wires, so that the finished fabric will be straight. This is accomplished by the method of, and mechanism for crimping in connection with the elasticity of the wires themselves, all of which combine to cause the desired result, as stated.

The general construction and arrangement of the machine frame, as shown in Figs. 1 and 8, is such that the operator can stand between the two parts thereof, facing the fencing in process of manufacture, and thereby give it the necessary attention, while at the same time, by merely turning around, he can see and control the winding of the finished fencing on the winding-barrel. This arrangement is at once compact, convenient and conducive to ease and cheapness of operation.

By varying the distances between the coilers, and between the other portions of the mechanisms which operate upon the various wires, a fence of any proportion can be made, and in case where the machine is constructed to make a wide fence, it may be operated to make two or more narrower strips of fencing at the same time, all of which will be readily understood.

For convenience of illustration and description, I have shown the machine with the axes of the coilers placed vertically and the strand-wires passing vertically through them, and the stay-wires finally applied thereto in approximately a horizontal direction, and in the specification and claims I use the words, vertical, vertically, horizontal, horizontally, angle, angular, above, below, etc., to denote relative positions, but it will be readily understood that these arrangements may be modified and that the relative or absolute positions of the various parts may be varied, without departing from the spirit of my invention.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by United States Letters Patent is:—

1. In a wire-fence machine, the combination of mechanism for feeding a plurality of strand-wires with accelerated and retarded motion, mechanism for continuously feeding a plurality of stay-wires diagonally between the strand-wires, mechanism for severing the forward ends of the said stay-wires to form cut-stays, and for swinging the opposite ends of said cut-stays into contact with the opposite sides of the adjoining strand-wires, and mechanism for simultaneously coiling the ends of the cut-stays around the strand-wire.

2. In a wire-fence machine, the combination of mechanism for continuously feeding a plurality of longitudinal strand-wires with accelerated and retarded motion, mechanism for continuously feeding a plurality of stay-wires diagonally between the strand-wires, mechanism for severing the forward ends of the said stay-wires to form cut-stays, and for swinging the opposite ends of the said cut-stays into contact with the opposite sides of the adjoining strand-wires, and mechanism for simultaneously coiling the ends of the cut-stays around the strand-wires.

3. In a wire-fence machine, the combination of mechanism for continuously feeding a plurality of longitudinal strand-wires with accelerated and retarded motion, mechanism for continuously and simultaneously feeding a plurality of stay-wires diagonally between the strand-wires, mechanism for simultaneously severing the forward ends of the said stay-wires to form cut-stays, and for swinging the opposite ends of said cut-stays into contact with the opposite sides of the adjoining strand-wires, and mechanism for simultaneously coiling the ends of the cut-stays around the strand-wires.

4. In a wire-fence machine, the combination of mechanism for continuously feeding a plurality of longitudinal strand-wires with accelerated and retarded motion, mechanism for continuously and simultaneously feeding a plurality of stay-wires diagonally between, but slightly removed from, the strand-wires, mechanism for simultaneously severing the forward ends of the said stay-wires to form cut-stays, and for swinging the opposite ends of said cut-stays into contact with the opposite sides of the adjoining strand-wires, and mechanism for simultaneously coiling the ends of the cut-stays around the strand-wires.

5. In a wire-fence machine, the combination of mechanism for continuously feeding a plurality of longitudinal strand-wires with accelerated and retarded motion, mechanism for continuously and simultaneously feeding a plurality of stay-wires diagonally between the strand-wires, mechanism for simultaneously severing the forward ends of the said stay-wires to form cut-stays, without stopping the continuous feed of the said stay-wires, and for swinging the opposite ends of said cut-stays into contact with the opposite sides of the adjoining strand-wires, and mechanism for simultaneously coiling the ends of the cut-stays around the strand-wires.

6. In a wire-fence machine, means for continuously feeding a plurality of stay-wires diagonally between the strand-wires, means for cutting said stay-wires and then swinging the ends of each cut-stay section into contact with the opposite sides of a pair of adjoining strand-wires, and means for coiling the ends of the cut-stays around the strand-wires.

7. In a wire-fence machine, means for continuously feeding and guiding a plurality of stay-wires diagonally between, and at slight distances from the strand-wires, means for simultaneously cutting the ends of the stay-wires, means for swinging the ends of the cut-stays into contact with the strand-wires, and means for coiling the ends of the cut-stays around the strand-wires.

8. In a wire-fence machine means for feeding a stay-wire above the coilers but out of axial alinement therewith and diagonally between a pair of adjoining strand-wires, means for cutting said stay-wire and then swinging the ends of the cut-stay into contact with the opposite sides of a pair of adjoining strand-wires and over the coilers, and means for coiling the ends of the cut-stay around the strand-wires.

9. In a wire-fence machine provided with a series of alined coilers, means for continuously advancing a plurality of longitudinal strand-wires therethrough with accelerated and retarded motion, means for continuously feeding a plurality of stay-wires diagonally between the strand-wires and beside the coilers, means for cutting the forward ends of the stay-wires to form cut-stays and for swinging the severed ends thereof into contact with the strand-wires, and means for coiling the ends of the cut-stays around the strand-wires.

10. In a wire-fence machine, means for continuously feeding a plurality of parallel longitudinal strand-wires therethrough with accelerated and retarded speed, means for continuously feeding a plurality of stay-wires transversely of, and diagonally between the adjoining strand-wires, but slightly removed therefrom, means for simultaneously severing the forward ends of said stay-wires to form cut-stays of lengths slightly greater than the distances between the corresponding strand-wires, and for swinging the forward ends of said cut-stays into contact with the adjoining strand-wires, and mechanism for coiling the ends of said cut-stays around the strand-wires.

11. In a wire-fence machine, means for continuously feeding a plurality of parallel longitudinal strand-wires therethrough with accelerated and retarded speed, means for continuously feeding a plurality of stay-wires transversely of, and diagonally between the adjoining strand-wires, but slightly removed therefrom, means for simultaneously severing the forward ends of said stay-wires to form cut-stays of lengths slightly greater than the distances between the corresponding strand-wires, and for swinging the forward ends of said cut-stays into contact with the adjoining strand-wires, means for oppositely and simultaneously swinging the other ends of said cut-stays into contact with the strand-wires adjoining them, and mechanism for coiling the ends of said cut-stays around the strand-wires.

12. In a wire-fence machine, means for continuously feeding a plurality of parallel longitudinal strand-wires therethrough with accelerated and retarded speed, means for continuously feeding a plurality of stay-wires transversely of, and diagonally between the adjoining strand-wires, but slightly removed therefrom means for simultaneously severing the forward ends of said stay-wires to form cut-stays of lengths slightly greater than the distances between the corresponding strand-wires, and for swinging the forward ends of said cut-stays into contact with the adjoining strand-wires, means for oppositely and simultaneously swinging the other ends of said cut-stays into contact with the strand-wires adjoining them, and mechanism for coiling the ends of said cut-stays around the strand-wires during the retarded movement thereof.

13. In a wire-fence machine, a series of alined coilers, means for supplying and advancing a plurality of strand-wires therethrough, means for feeding a plurality of stay-wires beside the coilers, but out of axial alinement therewith, means for simultaneously severing the ends of said stay-wires to form cut-stays and for swinging the forward ends of the same over the coilers and into contact with the adjoining strand-wires, and means for axially advancing and revolving the coilers, whereby the ends of the cut-stays are coiled around the strand-wires.

14. In a wire-fence machine, mechanism for continuously feeding a plurality of strand-wires with an accelerated and retarded motion, mechanism for continuously supplying a plurality of stay-wires simultaneously and transversely of the strand-wires, mechanism for severing suitable lengths of the stay-wires to overlap the adjoining strand-wires, and mechanism for coiling the overlapping ends of the stay-wires around the strand-wires.

15. In a wire-fence machine, mechanism for continuously feeding a plurality of strand-wires with an accelerated and retarded motion, mechanism for continuously supplying a plurality of stay-wires simultaneously and transversely of the strand-wires, mechanism for severing suitable lengths of the stay-wires to overlap the adjoining strand-wires, and mechanism for intercoiling the contiguous overlapping ends of the stay-wires around the intermediate strand-wires and for coiling the overlapping ends of the stay-wires around the marginal strand-wires.

16. In a wire-fence machine, mechanism for continuously feeding a plurality of strand-wires with an accelerated and retarded motion, mechanism for continuously supplying a plurality of stay-wires simultaneously and transversely of the strand-wires, mechanism for severing suitable lengths of the stay-wires to overlap the adjoining strand-wires, and mechanism for simultaneously intercoiling the contiguous overlapping ends of the stay-wires around the intermediate strand-wires, and at the same time coiling the overlapping ends of the stay-wires around the marginal strand-wires.

17. In a wire-fence machine, mechanism for continuously feeding a plurality of strand-wires with an accelerated and retarded motion, mechanism for continuously supplying a plurality of stay-wires simultaneously and transversely of the strand-wires, mechanism for severing suitable lengths of the stay-wires to overlap the adjoining strand-wires, and mechanism for coiling the overlapping ends of the stay-wires around the strand-wires, during the retarded motion thereof.

18. In a wire-fence machine, mechanism for continuously feeding a plurality of longitudinal strand-wires with alternating accelerated and retarded motion, mechanism for continuously feeding a plurality of stay-wires simultaneously and diagonally between the strand-wires, mechanism for severing suitable lengths of the stay-wires to overlap the adjoining strand-wires, mechanism for swinging the ends of said stay-wires against the adjoining strand-wires, and mechanism for coiling said ends around the strand-wires.

19. In a wire-fence machine, mechanism for continuously feeding a plurality of longitudinal strand-wires with alternating accelerated and retarded motion, mechanism for continuously feeding a plurality of stay-wires simultaneously and diagonally between the strand-wires, mechanism for severing suitable lengths of the stay-wires to overlap the adjoining strand-wires, mechanism for swinging the ends of said stay-wires against the adjoining strand-wires, and mechanism for intercoiling the contiguous overlapping ends of the stay-wires around the intermediate strand-wires, and for coiling the overlapping ends of the stay-wires around the marginal strand-wires.

20. In a wire-fence machine, mechanism for continuously feeding a plurality of longitudinal strand-wires with alternating accelerated and retarded motion, mechanism for continuously feeding a plurality of stay-wires simultaneously and diagonally between the strand-wires, mechanism for severing suitable lengths of the stay-wires to overlap the adjoining strand-wires, mechanism for swinging the ends of said stay-wires against the adjoining strand-wires, and mechanism for simultaneously intercoiling the contiguous overlapping ends of the stay-wires around the intermediate strand-wires, and at the same time, coiling the overlapping ends of the stay-wires around the marginal strand-wires.

21. In a wire-fence machine, mechanism for continuously feeding a plurality of longitudinal strand-wires with alternating accelerated and retarded motion, mechanism for continuously feeding a plurality of stay-wires simultaneously and diagonally between the strand-wires, mechanism for severing suitable lengths of the stay-wires to overlap the adjoining strand-wires, mechanism for swinging the ends of said stay-wires against the adjoining strand-wires, and mechanism for coiling said ends around the strand-wires, during the retarded motion thereof.

22. In a wire-fence machine, mechanism for continuously feeding a plurality of strand-wires with an accelerated and retarded motion, mechanism for continuously supplying a plurality of stay-wires simultaneously and transversely of the strand-wires, mechanism for severing suitable lengths of the stay-wires to overlap the adjoining strand-wires, mechanism for coiling the overlapping ends of the stay-wires around the strand-wires, and mechanism for crimping the strand-wires between the stay-wires.

23. In a wire-fence machine, mechanism for continuously feeding a plurality of strand-wires with an accelerated and retarded motion, mechanism for continuously supplying a plurality of stay-wires simultaneously and transversely of the strand-wires, mechanism for severing suitable lengths of the stay-wires to overlap the adjoining strand-wires, mechanism for coiling the overlapping ends of the stay-wires around the strand-wires, and mechanism for clamping and crimping the strand-wires between the stay-wires, said clamping and crimping mechanism being also adapted to pull the forward portions of the strand-wires with a continuous motion.

24. In a wire-fence machine, a series of alined coilers, provided with means for continuously revolving the same, means for advancing a plurality of strand-wires therethrough with alternatingly accelerated and retarded motions, means for continuously feeding a plurality of stay-wires through guides adapted to deliver them diagonally between the strand-wires above the coilers, but out of axial alinement therewith; mechanism for severing suitable lengths of the stay-wires to overlap the adjoining strand-wires, thereby forming cut-stays, mechanism for swinging the ends of the said cut-stays against the adjoining strand-wires, mechanisms for axially moving said coilers, whereby they engage the overlapping ends of said cut-stays and coil them around the strand-wires during the retarded motion thereof.

25. In a wire-fence machine, a series of alined coilers, means for advancing a plurality of strand-wires therethrough, means for feeding a plurality of stay-wires diagonally between said strand-wires, fixed guides between the coilers, each guide having a notch provided with a narrow neck adapted to contact with said stay-wires therein, means for cutting said stay-wires and for swinging their ends against said strand-wires, while said narrow necks serve as fulcra.

26. In a wire-fence machine, a series of alined coilers, means for advancing a plurality of strand-wires therethrough, means for feeding a plurality of stay-wires diagonally between said strand-wires, fixed guides between the coilers, each guide having a notch provided with a narrow neck therein adapted to contact with said stay-wires, means for cutting said stay-wires and for swinging their ends against said strand-wires, while said narrow necks serve as fulcra, and means for revolving and axially moving said coilers, whereby the ends of the cut-stays are coiled around the strand-wires.

27. In a wire-fence machine, a series of alined coilers, means for advancing a plurality of strand-wires therethrough with accelerated and retarded motions, mechanism for continuously feeding a plurality of stay-wires diagonally between said strand-wires, mechanism for severing the ends of said stay-wires to form cut-stays and for swinging the ends of the same over the coilers and into contact with the adjoining strand-wires, mechanism for continuously rotating the coilers and for axially projecting and retracting the same, whereby the ends of the cut-stays are coiled around the strand-wires during the retarded movement thereof.

28. In a wire-fence machine, the combination of a plurality of alined coilers, means for advancing a plurality of strand-wires therethrough with accelerated and retarded motion, means for feeding a plurality of cut-stays against the strand-wires, gearing for continuously rotating said coilers, and cam mechanism for slightly advancing the coilers during the retarded motion of the strand-wires, and for retracting the same thereafter.

29. In a wire-fence machine, a plurality of alined coilers, means for advancing a plurality of strand-wires therethrough, guides arranged between the coilers adapted to direct the stay-wires diagonally between, but at substantial distances from said strand-wires, and means for swinging the ends of said stay-wires against said strand-wires.

30. In a wire-fence machine, mechanism for continuously feeding a plurality of strand-wires with an accelerated and retarded motion, mechanism for continuously supplying a plurality of stay-wires transversely of said strand-wires, and mechanism for coiling the ends of the stay-wires around said strand-wires; in combination with a continuously revolving crimping-cylinder, adapted to clamp and crimp said strand-wires.

31. In a wire-fence machine, mechanism for feeding a plurality of strand-wires, mechanism for continuously supplying a plurality of stay-wires transversely of said strand-wires, and mechanism for coiling the ends of the stay-wires around said strand-wires; in combination with a continuously revolving crimping-cylinder, adapted to pull, clamp and crimp said strand-wires, and an adjustable vibrating take-up roll located between the coiling mechanism and the crimping-cylinder, whereby said strand-wires are advanced through the coiling mechanisms with an accelerated and retarded motion.

32. In a wire-fence machine, a series of alined coilers, means for advancing strand-wires therethrough, means for feeding a plurality of stay-wires diagonally above and beside the coiler-heads, but out of vertical alinement therewith, means for cutting and swinging the ends of the stay-wires over the coiler-heads into contact with opposite sides of the adjoining strand-wires, and means for operating the coilers to wind the ends of the stay-wires around the strand-wires.

33. In a wire-fence machine of the class described, provided with a series of alined coilers and means for advancing strand-wires therethrough, means for continuously feeding stay-wires transversely of the strand-wires, comprising a series of continuously driven feed-rolls, each of which is opposed by a pressure-roll, and a series of guides for the stay-wires, arranged diagonally of the strand-wires.

34. In a wire-fence machine of the class described, provided with a series of alined coilers and means for advancing strand-wires therethrough, means for continuously feeding stay-wires transversely of the strand-wires; comprising a series of continuously driven feed-rolls, each of which is opposed by a pressure-roll, and a series of guides for the stay-wires, arranged diagonally of the strand-wires; and means for cutting off suitable lengths of stay-wires and swinging the ends thereof against the strand-wires.

35. In a wire-fence machine of the class described, the combination with a series of alined coilers and means for feeding a plurality of strand-wires therethrough; of a stay-feed-mechanism comprising opposing pairs of continuously revolving rolls, stay-wire guides arranged diagonally of the strand-wires, means for cutting off the stay-wires suitable lengths of cut-stays to overlap the adjoining strand-wires, and means for swinging the ends of the said cut-stays into contact with the opposite sides of each pair of adjoining strand-wires.

36. In a wire-fence machine of the class described, provided with means for continuously feeding a plurality of stay-wires through or against a corresponding plurality of stationary knives; a reciprocating knife-holder-bar in which are pivotally mounted a plurality of knives, each provided with a forward cutting edge, to co-act with the stationary knives, each pivoted knife having a lower sloping projection, thereby adapting said pivoted knives to cut the stay-wires on the forward stroke of the said bar, and to swing upwardly over the next incoming stay-wire on the return stroke.

37. In a wire-fence machine of the class described, provided with means for continuously feeding a plurality of stay-wires, a corresponding number of knives pivotally mounted in a reciprocating knife-holder-bar, the forward end of each pivoted knife having a cutting edge adapted to sever a stay-wire, a corresponding series of stationary knives adapted to co-act therewith, the forward end of each pivotal knife being provided with a sloping lower surface adapted to lift the knife by swinging it over the next incoming stay-wire, whereby the feed of the stay-wires is not interrupted.

38. In a wire-fence machine of the character described, a plurality of stationary knives, a reciprocating knife-holder-bar in which are pivotally mounted a series of swinging knives, each of which has a forward cutting edge adapted to co-act with the corresponding stationary knife, each swinging-knife also having a lower sloping surface adapted to lift said knife over an incoming stay-wire without interrupting the movement thereof.

39. In a wire-fence machine of the character described, a reciprocating knife-bar-holder in which is mounted a plurality of pivoted knives each provided with a forward cutting edge and a lower sloping projection, a reciprocating pusher-finger-bar on which is mounted a corresponding series of pusher-fingers, each of which is provided with a wire-engaging notch on its forward edge, said pusher-fingers being opposite to, but in staggered relation with said swinging knives.

40. In a wire-fence machine of the class described, the combination with the stay-wire feeding and guiding mechanism, of a reciprocating knife-holder-bar having a series of stay-wire cutting and pushing knives mounted therein, and means for delaying the return reciprocation of the said bar when in its extreme forward position, for the purpose of holding the stay-wires in position for the succeeding operation.

41. In a wire-fence machine of the class described, a stay-wire cutter-bar provided with a series of knives therein, said cutter-bar being reciprocated by an eccentric rod having an elongated hole therein, whereby the return movement of the knives is slightly delayed for the purpose of holding the stay-wires in position for the succeeding operation.

42. In a wire-fence machine of the class described, the combination with the stay-wire feeding and guiding mechanism, of a reciprocating pusher-finger-bar having a series of stay-wire pusher-fingers mounted thereon, and means for delaying the return reciprocation of the said bar when in its extreme forward position, for the purpose of holding the stay-wires in position for the succeeding operation.

43. In a wire-fence machine of the class described, a stay-wire pusher-finger-bar provided with a series of pusher-fingers thereon, said bar being reciprocated by an eccentric rod having an elongated hole therein, whereby the return movement of the pusher-fingers is slightly delayed for the purpose of holding the stay-wires in position for the succeeding operation.

44. In a wire-fence machine of the class described, a crimping-cylinder, the exterior of which comprises a series of bars provided with notches therein forming jaws for the reception of the strand-wires, U-shaped crimping-members pivoted on said bars adjoining each of the notches aforesaid, means for revolving said cylinder and for swinging said U-shaped members to and from said notches.

45. In a wire-fence machine of the class described, a crimping-cylinder adapted to advance the strand-wires therethrough, the exterior of said cylinder comprising a series of bars provided with notches forming jaws therein for the reception of the strand-wires, U-shaped crimping-members pivoted on said bars adjoining each of the notches aforesaid, stationary cam members mounted at one side of the said cylinder and adapted to contact with the projecting ends of said crimping-members, and move them over said notches, a series of stationary return-cam members at the other side of said cylinder adapted to engage said U-shaped crimping-members and move them in the reverse direction.

46. In a wire-fence machine, means for feeding a plurality of stay-wire sections diagonally between the strand-wires, means for holding the centers of the stay-wire sections against lateral movement, a reciprocating finger-bar provided with a plurality of pusher-fingers adapted to push one end of each stay-wire into contact with a strand-wire, a plurality of reciprocating knife blades adapted to cut and push the opposite ends of each of the stay-wires into contact with the adjacent strand-wires, and means for coiling the ends of the stays around the strand-wires.

47. In a wire-fence machine of the class described, means for continuously feeding a plurality of stay-wires through a corresponding number of stationary knife-blades, a plurality of movable blades co-acting therewith and adapted to cut the stay-wires into the proper lengths, and by their continued movement to push the ends of the stays into the desired positions for further operations.

48. In a wire-fence machine of the class described, a continuously rotating cylinder provided with crimping mechanism adapted to grip the strand-wires and pull them through the machine, a swinging take-up roll located between the said rotating cylinder and the coilers, and means for adjusting the amplitude of the swing of said roll to cause a variation of the movement of the strand-wires at the coilers.

49. In a wire-fence machine of the class described, a continuously rotating cylinder adapted to grip the strand-wires and pull them forward, and an adjustable take-up device located between the rotating cylinder and the coilers, said take-up device comprising upper and lower fixed rolls and a movable central roll adjustably mounted on a swinging arm.

50. In a wire-fence machine of the class described, a continuously rotating cylinder adapted to grip the strand-wires and pull them forward, an adjustable take-up device between the continuously rotating cylinder and the coilers, comprising an upper and lower fixed member, and a central adjustable member mounted on a pair of swinging arms, and means attached to said swinging arms for operating the same.

51. In a wire-fence machine of the class described, a continuously rotating cylinder, means on the cylindrical surface thereof for gripping and crimping the strand-wires and pulling them through the machine, an adjustable take-up device between the continuously rotating cylinder and the coilers, comprising an upper and a lower fixed idler roll and an adjustable roll interposed between the two fixed idlers, said adjustable roll being mounted on a pair of swinging arms, pitmen attached to said swinging arms and connected with revoluble cranks for operating the interposed adjustable roll.

52. In a wire-fence machine, a continuously rotating cylinder provided with means on its cylindrical surface adapted to grip and crimp the strand-wires and pull them through the machine, an adjustable take-up device interposed between the continuously rotating cylinder and the coilers, said adjustable take-up device comprising an upper and a lower idler roll mounted in fixed bearings, a pair of slotted swinging arms pivoted at each side of the machine, pitmen connecting the swinging arms to revoluble crank arms operating the swinging arms, and a roll mounted in adjustable bearings on the swinging arms to vary the movement of the strand-wires as they pass through the coilers.

53. An adjustable take-up device for varying the movement of the strand-wires in a wire-fence machine, comprising upper and lower idler-rolls provided with fixed bearings mounted on the machine frame, an interposed movable roll mounted on a pair of swinging arms pivoted at each side of the machine, pitmen connecting the swinging arms with revoluble cranks for operating the said swinging arms, a longitudinal slot extending through each of the swinging arms, adjustable bearings for said movable roll, each bearing having a threaded projection extending through the slot in one of the swinging arms, whereby the said bearing may be clamped by means of a nut at different points along the swing arm.

54. In a wire-fence machine, a plurality of bars mounted as the outer members of a cylinder, a series of notches forming jaws in the outer edges of said bars adapted to receive the strand-wires, a series of U-shaped crimping members embracing, and pivoted to said bars, adjoining each of the notches aforesaid, means for revolving said cylinder, and for swinging said crimping members thereby.

55. In a wire-fence machine, mechanism for feeding forward stay-wires, comprising continuously rotating feed-rolls and opposed pressure-rolls of varying sizes geared together and mounted on parallel shafts, a pivoted holder for supporting each of the pressure-rolls, a spring for exerting pressure on each holder, a cam-lever contacting with each spring and adapted to put each pressure-roll into, or out of operative connection with its feed-roll, as desired.

56. In a wire-fence machine, a reciprocating knife-blade comprising a shank fitted into a recess in the end of a pivoted knife-holder, a set-bolt screwed in the shank of the knife-blade and passing through a slot in the knife-holder for adjusting the knife-blade thereon, a curved downwardly extending cutting edge beveled on its lower rear side, thereby adapting it to rise and pass over the continuously feeding stay-wire on the return stroke.

57. In a wire-fence machine, a cutter bar, a plurality of knife-holders pivoted therein, said cutter bar comprising two rectangular bars secured together, a semi-circular groove on the inner face of each of the rectangular bars, together forming a circular groove extending through the intermediate portion of the bar, adapted to receive the pivoted ends of the knife-holders, wedge-shaped notches in the inner faces of the rectangular bars extending from the circular groove to one edge of the bar, whereby said pivoted knife-holders may swing and be supported and guided by the sides of said notches.

58. In a wire-fence machine, a rotating cylinder for gripping and advancing the strand-wires, and means for changing the speed of said rotating cylinder with respect to that of the main driving-shaft which controls the timing of the application of the stay-wires, whereby the spacing of the stay-wires on the strand-wires is varied as predetermined.

59. In a wire-fence machine, a continuously rotating gripping cylinder provided with means for continuously feeding a plurality of strand-wires through the machine, means for attaching a plurality of stay-wires to said strand-wires at regular intervals of time, with respect to the motion of the main driving-shaft, a plurality of pairs of interchangeable gears mounted on opposite shafts positively driven from the main driving-shaft, adapted to rotate the cylinder aforesaid, and means for throwing into, or out of mesh, the various pairs of interchangeable gears, whereby the speed of the strand-wires is changed, thereby causing different and predetermined spacing of the stay-wires thereon.

60. In a wire-fence machine, means for continuously feeding a plurality of stay-wires obliquely between the strand-wires, means for cutting the stay-wires into stay-wire-sections, guide-tables having notches for holding said stay-wire-sections, and means for adjusting the widths of the notches on the guide-tables.

61. A coiler for wire-fence machines, comprising an external annular sleeve revolubly mounted in an axially reciprocable bearing, a coiler-head on the end of said external sleeve, an internal axially perforated spindle mounted within the other end of said sleeve and secured thereto by longitudinally slidable connections, and means for reciprocating said bearing and for revolving said spindle.

62. In a coiler for wire-fence machines, an axially perforated spindle provided with means for revolving the same, an external annular sleeve mounted on one end thereof and revolubly secured thereto by longitudinally slidable connections, said external annular sleeve being mounted in an exterior axially reciprocable bearing, a coiler-head on the end of said sleeve, and means for longitudinally advancing and retracting said sleeve.

63. In a coiler for wire-fence machines, an external annular sleeve provided with a coiler on one end thereof, said sleeve being axially and revolubly supported in a reciprocable bearing, an internal axially perforated spindle mounted within the other end of said sleeve and revolubly secured thereto by a longitudinally slidable spline and feather connection, means for supporting and revolving said spindle and for reciprocating said bearing.

64. In a coiling mechanism for wire-fence machines, an axially perforated spindle revolubly mounted and axially secured in a fixed bearing, means at one end of said spindle for revolving the same, an external annular sleeve provided with a coiler on the end thereof, said sleeve being slidably mounted on the other end of said spindle and revolubly secured thereto by spline and feather connections, said external sleeve being mounted in, and axially supported by a reciprocable bearing.

65. In a coiling mechanism for wire-fence machines, an axially perforated spindle revolubly mounted and axially secured in a fixed bearing, means at one end of said spindle for revolving the same, an external annular sleeve provided with a coiler on the end thereof, said sleeve being slidably mounted on the other end of said spindle and revolubly secured thereto by spline and feather connections, said external sleeve being mounted in, and axially supported by a bearing mounted on a lifting-arm, and means for reciprocating said arm.

66. In a wire-fence machine of the class described, the combination with the revolving and reciprocable coiler-heads thereof, of fixed shields surrounding said coiler-heads, each comprising an external shell having an internal cylindrical opening, from which openings the coiler-heads may be axially projected and within which they may be retracted.

67. In a wire-fence machine, a plurality of revolving coilers through the axes of which, strand-wires are fed, a plurality of fixed shields within which the coiler-heads inoperatively rotate, mechanisms for supplying a plurality of cut-stay-wires into contact with the strand-wires over the coilers, rotating cams adapted to raise the coiler-heads above the shields, and thereby grasp the ends of the cut-stay-wires and coil them around the strand-wires, and springs operating on said coilers to assist in quickly returning the coiler-heads to their inoperative positions within the shields.

68. In a wire-fence machine, a rotating cylinder provided with means to firmly grip and crimp the strand-wires and advance the finished fencing, a mechanical indicator adapted to measure the length of the fencing as it passes over the said rotating cylinder, and positive driving connections between said cylinder and indicator.

69. A wire-fence machine comprising a main-frame, containing the mechanism for assembling and securing together the various parts, a forward frame spaced apart from the main-frame and supporting the winding-barrel for receiving the finished fencing, a top cross-frame carrying the crimping-cylinder, its attachments, and connecting the upper portions of the other two frames, so proportioned as to admit the operator between the two first named frames and below the cross-frame, whereby all the operations are under close inspection and control.

In testimony whereby I hereto affix my signature in the presence of two witnesses.

JOHN A. HOLMQUIST.

Witnesses:
J. F. GROGAN,
ELMER SEAVEY.

Copies of this patent may be obtained for five cents each, by addressing the "Commissioner of Patents, Washington, D. C."